United States Patent [19]

Mary

[11] Patent Number: 5,280,479
[45] Date of Patent: Jan. 18, 1994

[54] DEVICE FOR INSERTION OF DIGITAL PACKETS IN A TRANSMISSION CHANNEL

[75] Inventor: Jean Mary, Orsay, France

[73] Assignee: Matra Communication, Quimper, France

[21] Appl. No.: 899,684

[22] Filed: Jun. 17, 1992

[30] Foreign Application Priority Data

Jun. 18, 1991 [FR] France ................ 91 07443

[51] Int. Cl.$^5$ ................................................ H04J 3/26
[52] U.S. Cl. ................................ 370/85.6; 370/94.1; 370/112; 358/142
[58] Field of Search ............... 370/61, 85.1, 85.6, 370/85.9, 85.12, 85.13, 94.1, 94.3, 112; 340/825.5, 825.51; 358/142, 143, 146

[56] References Cited

U.S. PATENT DOCUMENTS 4,630,261 12/1986 Irvin ...................... 370/81
5,050,161 9/1991 Golestani ................. 370/85.6

FOREIGN PATENT DOCUMENTS 0171596 2/1986 European Pat. Off.
2625528 3/1978 Fed. Rep. of Germany.
2629972 10/1989 France.

OTHER PUBLICATIONS

Rundfunktechnische Mitteilungen vol. 29, No. 1, Jan. 1, 1985, Norstedt De, pp. 23-35; Christoph Dosch: "C-- MAC/Packet—Normvorschlag der Europäischen Runkfunkunion für den Satellitenrundfunk."
IEEE Proceedings International Conference on Consumer Electronics, Jun. 6, 1989, Rosemont (US), pp. 280-281; F. Courtot et al: "A single conditional access system for satellite-cable and terrestrial tv."

Primary Examiner—Douglas W. Olms
Assistant Examiner—Melvin Marcelo
Attorney, Agent, or Firm—Larson & Taylor

[57] ABSTRACT

The multiplexing device is for insertion of digital packets, supplied by several different sources, in a same transmission channel having an average data rate at least equal to the sum of the average data rates supplied by the sources. It comprising a packet call input unit connected to the transmission channel. The sources are cascaded and the downstream source constitutes an interface towards the input unit. Each source comprises a generator of an insertion priority order for each packet as a function of the type of packet, of the number of stored packets, and of insertion rules associated with the type of packets to be transmitted. Each cascaded source, with the exception of the most upstream source, has a routing circuit supplying at its output the highest priority among the two priorities applied to its input, and of which one corresponds to the source itself and the second to the upstream unit.

8 Claims, 3 Drawing Sheets

DEVICE FOR INSERTION OF DIGITAL PACKETS IN A TRANSMISSION CHANNEL

BACKGROUND OF THE INVENTION

The present invention concerns a device for the insertion of digital packets supplied by different sources in a transmission channel having an available average flow rate at least equal to the sum of the average flow rates supplied by the sources. It has a particularly important application in the insertion of packets to form the digital multiplex of a television signal belong into the X-MAC/PACKET family.

In a X-MAC/PACKET signal, the flow of bits intended for sound and data transmission and broadcasting is distributed in packets of fixed length, each having an address of 23 bits, serving to identify the origin of the packet, and a useful part of 728 bits. The channel has a data rate with a constant average value (ranging, depending on each case, from 2,050 to 24,600 packets per second) but with a variable instantaneous value. The input unit of the output channel, consisting for example of the time division multiplexer for deformation of the multiplex intended to be addressed to the modulator, make the request for packets in accordance with its availabilities.

Each source displays data rate characteristics and insertion rules in the output channel which are specific to it. The order of insertion of the packets in the out channel must take this factors into account.

In the case, for example, of a D2-MAC/PACKET system with conditional access according to the "EUROCRYPT" standard, the digital channel may have to transmit one or more sound channels each demanding a capacity of 250 to 1778 packets per second, and whose phase shift with respect to the image must remain small (original sound and dubbing, for example), one or more high fidelity sound channels demanding a higher data rate than the above, an identification channel for the services consisting of packets having address "zero", and of packets representing the entitlement checking messages ECM and the entitlement management messages EMM. Further more, the digital channel must transmit any teletext signals in packets.

It is clear that the sources have data rates which vary from source to source and insertion rules which may also vary.

Several insertion techniques already exist.

The one described in the document called "The EBU-MAC/PACKET system for direct broadcasting by satellite", by Mertens et al, IEEE International Conference on Communications, ICC 84, vol. 1, p. 1-9 North-Holland, New-York, consists in presenting data from various sources to a multiplexer comprising a number of input buffer memories equal to the number of sources. Whenever the multiplexer is ready to form a packet, it examines the buffer memories in an order of priority which depends on the needs of service continuity, and it selects the data in a memory which contains sufficient information to make up a whole packet.

Document FR-A-2 629 972 describes a priority management device having two cascaded FIFOs. The output from the second is connected to an input of a multiplexer. The input of the first is connected to a comparator and to the other input of the multiplexer.

SUMMARY OF THE INVENTION

An object of the invention is to supply an improved insertion device. It is a more specific object to provide a device making it possible to add additional sources without further significant appreciable work for the packet multiplexer, and without any need to modify the multiplexer, since all the sources have the same general construction and can be made in the form of integrated circuit or ASICs.

To achieve this, there is provided a device for insertion of digital packets in a transmission channel supplied by a plurality of different sources, in a common transmission channel having an average data rate at least equal to the sum of the average data rates supplied by the sources, comprising a packet call input unit connected to the transmission channel, wherein: at least some of said sources are cascaded the downstream one of said cascaded sources constituting an interface with the input unit; each source in the cascade comprises means for generating, for each packet, an insertion priority order which is a function of the type of packet, of the number of stored packets, and of insertion rules associated with the type of packets to be transmitted; and each cascaded source, with the exception of the most upstream source, has a routing circuit supplying at its output the highest priority among the two priorities applied to its input, and of which one corresponds to the respective source itself and the second to the upstream source located upstream.

In such a device, the packet storage function is transferred to the sources.

If the average data rate of the channel is significantly higher than the average total data rate of the sources, and if the variations in available instantaneous data rate only represent for a small fraction of the average data rate, each source may be designed to set the order of priority of the packet to be transmitted once and for all. If, on the contrary, the average data rate of the channel is only slightly higher than the sum of the average data rates, it may be preferable to provide the sources so that they give the packets an increasing priority in accordance with the waiting time.

In the particular case mentioned above, of an insertion device for D2-MAC/PACKET conditional access modulator, it is possible to delay significantly the entitlement checking messages, which are only repeated at intervals of about 500 ms, with modification of the control words every 10 seconds, with an advance on the time of modification of the control word; it is even more possible to delay the access entitlement and access rights management messages, which need only be transmitted at sufficiently short intervals for subscribers to avoid experiencing excessive delays.

The cascade mounted sources can drive the input unit through an interface for selection between several input channel in parallel.

The invention can be better understood on the reading of the description which follows of a particular embodiment given as a non-limiting example.

DETAILED DESCRIPTION OF PREFERRED EMBODIMENTS

Figure 1:
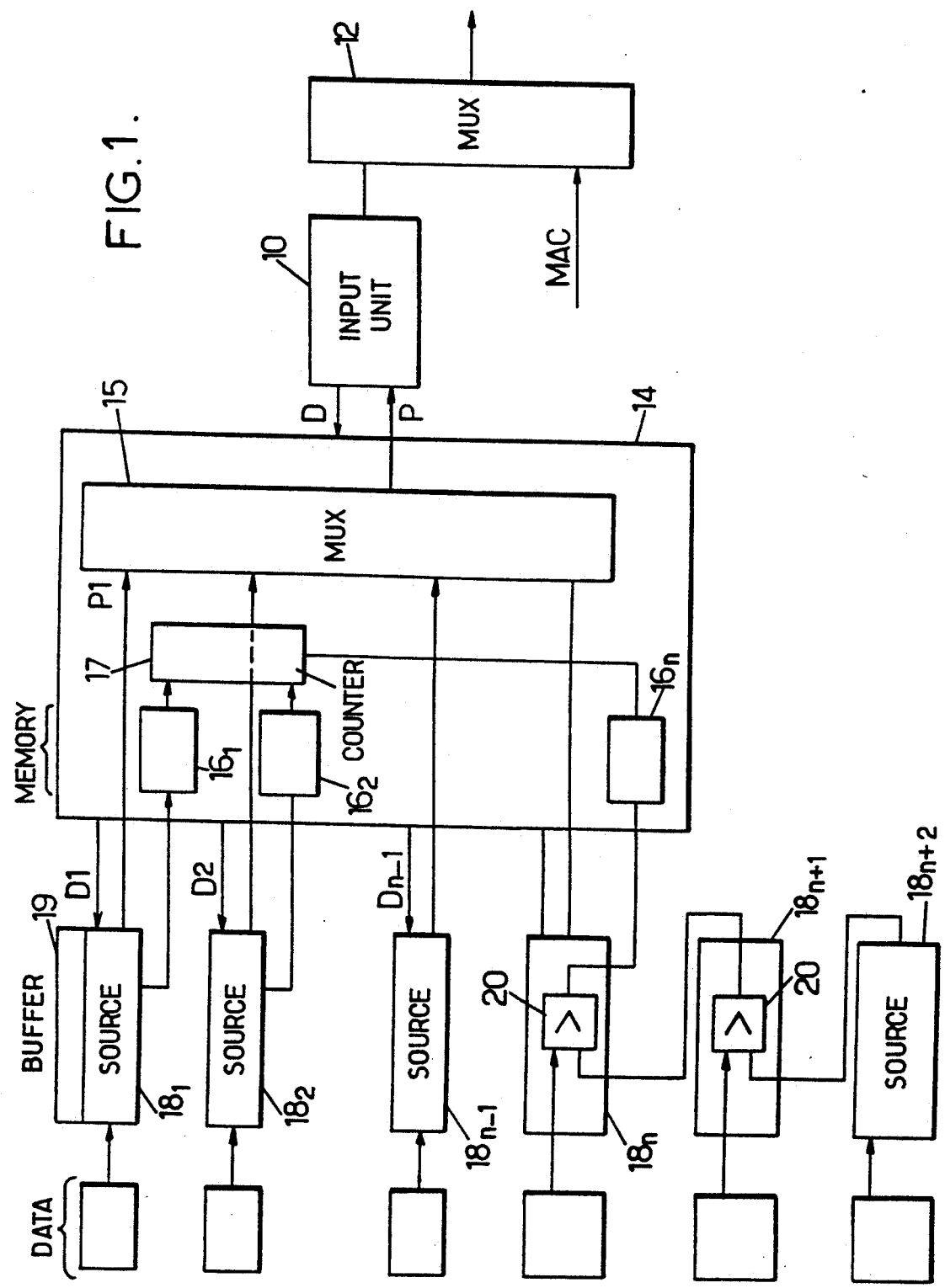
FIG. 1 is a schematic diagram showing an insertion device according to a particular embodiment.

The insertion device shown in FIG. 1 is for supplying, to the input unit 10 of an output channel, the packets intended to make up the digital, duo-binary encoded part, of a time-division baseband multiplex formed by a multiplexer 12. To achieve this, the input unit 10 is designed, in a conventional arrangement, to send requests D for packets, in accordance with the availibilities, and to distribute the packets P which it receives in bursts.

The embodiment shown in FIG. 1 comprises several input channels in parallel and a packet multiplexing selector 14 which serves to transfer the packet having the highest priority to unit 10. To achieve this, it comprises an actual selector 15, memories $16_1$, $16_2$, ..., $16_n$ each designed to store an order of priority corresponding to a packet available from a respective channel 1, 2, ... n, and a circuit 17 for counting the packets stored in memories and for storing their type.

The multiplexing selector is designed to select the source which corresponds to the highest order of priority and to transfer one packet (or several packets in a predetermined number) from the selected input channel to the output channel.

As shown, channels 1 to n−1 have a single source. Source $18_1$, for example, is designed to group the data which it receives, into packets each having the same address, and to define a priority. The source may in particular comprise a buffer memory 19 for accumulating the input data, and means for formating these data in packets having a header, and for assigning a priority to the packets. This assignment can be done:

in accordance with the type of packets, according to a criterion fixed for the source, depending on the number of queuing packets, the order of priority rising as the memory of the source is being filled, based on predetermined insertion rules, possibly taking account of an acknowledgement signal sent by multiplexer 12 generating a baseband multiplex.

All the sources may have the same construction, of the type described above.

However, some sources may have a special function.

In the case shown, for example, source $18_{n-1}$ consists of a source of stuffing packets, having the lowest priority, to which address 1023 is assigned.

The channel n has a particular construction, which is in accordance with the invention. The downstream source $18_n$ of this channel constitutes a multiplexing interface, enabling the packet multiplexing selector 14 to process several sources without hardware or software complication. To achieve this, source $18_n$ comprises a routing circuit 20 supplying at its output the highest priority among the two priorities applied to its input, and each of the additional sources $18_{n-1}$, $18_{n-2}$, ..., up to the penultimate inclusive, has the same construction. Thus the only priority which is presented to the packet multiplexing selector 14 is the highest among those of all the additional sources. One possible construction of the sources is described below in reference to FIG. 2.

The operation of the device can be inferred immediately from the above description : when a request for packets D is sent to the packet multiplexing selector 14, the latter determines the source which has the highest priority and transmits a request to it, D1 for example. In reply, the interrogated source transmits a packet, P1 for example, to the output.

Figure 2:
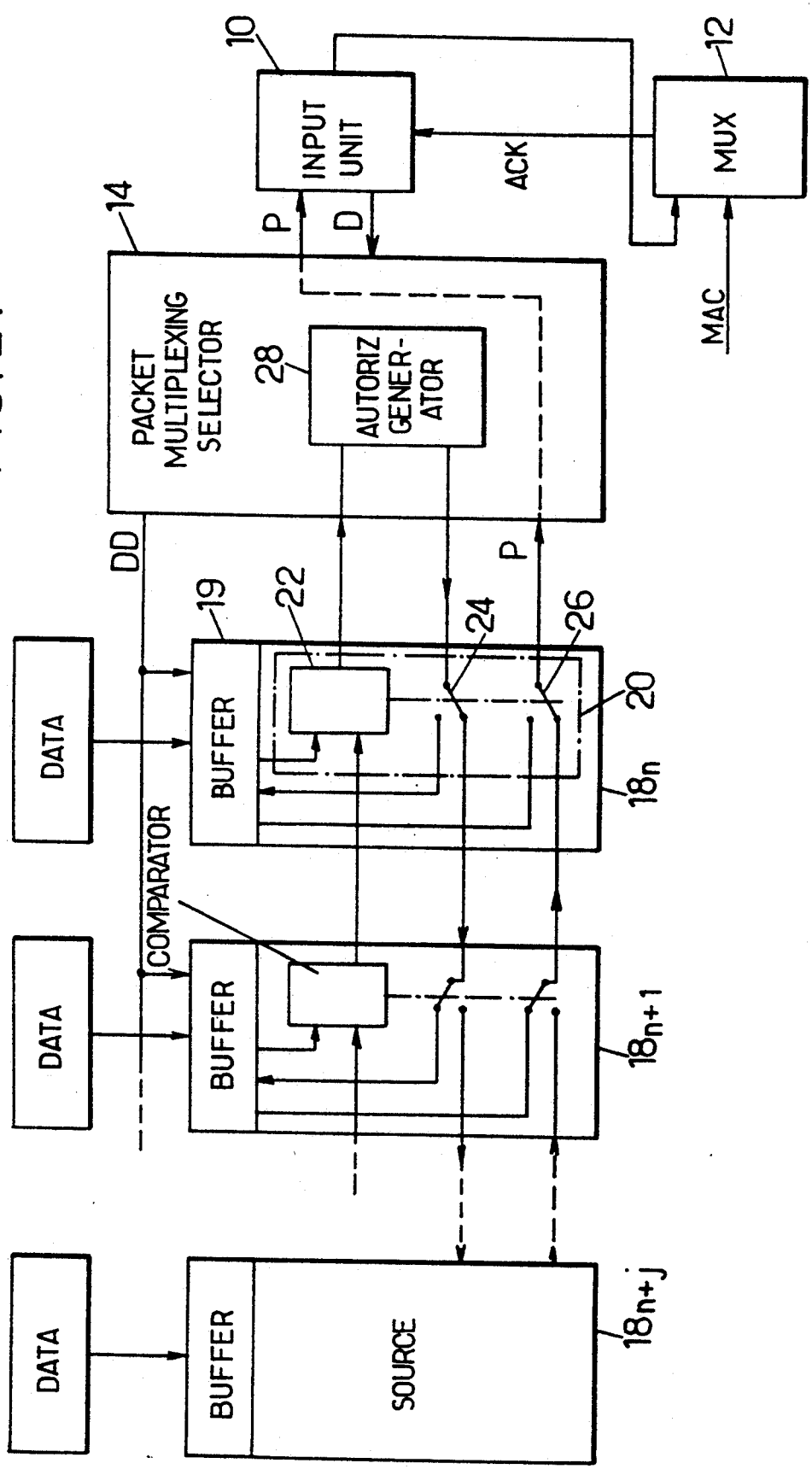
FIG. 2 shows a modified embodiment.

The multiplexing device shown in FIG. 2 (where the components corresponding to those in FIG. 1 bear the same reference number) is different from the previous one in that it has a single input channel. As a consequence, the multiplexing selector 14 is highly simplified.

All the sources may have the same construction.

Each of them, with the exception of the most upstream source $18_{n+j}$, has the same function. Source $18_n$, for example, comprises a packet generating circuit 19 and a routing circuit 20. Each routing circuit can be regarded as having a priority comparator 22 and two switches 24 and 26 controlled by the comparator 22. The latter receives a local priority order indication generated by circuit 19 and an upstream priority order indication from the source located immediately upstream. It transmits the highest priority further downstream and sets the switch 24 upward (in the case of FIG. 2) if the local priority is equal to or greater than the upstream priority, and downward in the opposite case. The priority selected at the downstream end is communicated to a transmission authorization generator 28 belonging to selector 14. In response to a request for packets, the latter generates an authorization which is routed towards the appropriate circuit 19 by the first switch 24 located upward which is found. This switch causes the transmission, by circuit 19, of a packet which reaches the selector 14 via the switches 24 of the source which transmits and of those placed downstream. Multiplexer 20 can be designed to return an acknowledgement signal ACK once a burst is inserted.

In the case already considered of an insertion device for a D2-MAC modulator, the priorities may increase as follows:
   stuffing packets,
   entitlement management messages,
   entitlement checking messages,
   "zero" channel (of which the order of priority can be modulated in accordance with the number of packets to be transmitted on this channel),
   data channel,
   high rate sound channel, if the source has not begun to transmit a group consisting of a predetermined number of packets on the way,
   high rate sound channel, if a transmission is under way,
   low rate sound channel.

The latter two priorities can be raised or lowered according to the number of packets to be transmitted.

Figure 3:
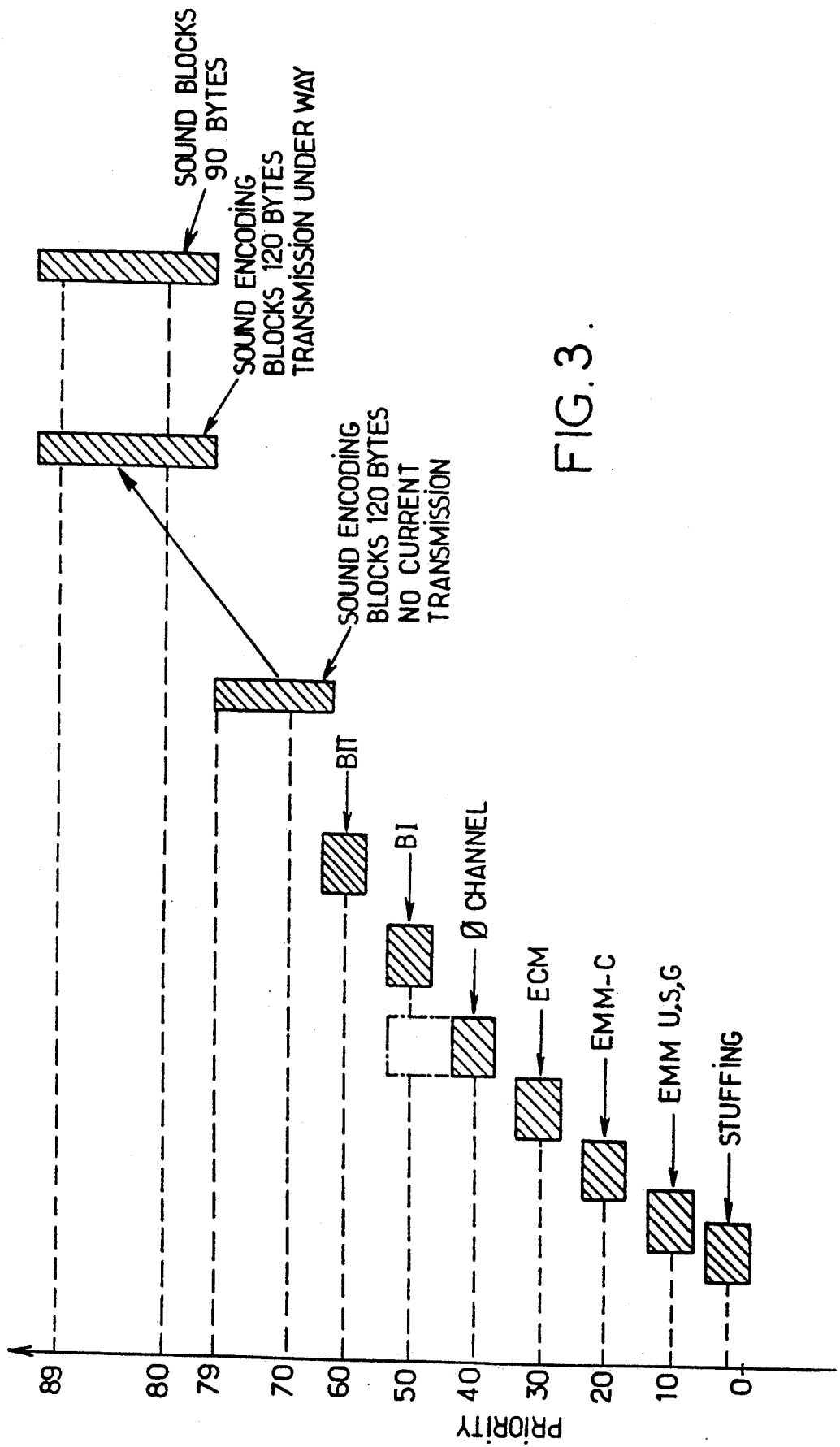
FIG. 3 shows a possible organization of the priorities, for a D2multiplex.

FIG. 3 shows, as an example, the priority levels which can be assigned to the different packets, if the insertion in a D2MAC modulator based on the "EUROCRYPT" conditional access defined by the publication "Système d'accès conditionnel pour la famille MAC/PAQUET: EUROCRYPT", March 1989, Ministère des Postes, des Télécommunications et de l'Espace et autres. Fixed and staged priorities are assigned to the entitlement management messages (EMM), to the entitlement control messages (ECM), to the "zero" channel, and to the sound channel interpretation blocks BI. In the example shown, the increasing priorities are represented by:
   10 for the management messages designed for a single subscriber, for a shared group, and for the general audience (EMM-U, EMM-S and EMM-G);
   20 for management messages intended for communities (EMM-C);

30 for the entitlement control messages (ECM);
40 for the zero channel;
50 for the sound interpretation blocks BI;
60 for the interpretation blocks indicating the changes and signal type BIT.

In a modification, the priority of the "zero" channel can be modulated in accordance with the number of packets to be transmitted. A counter can be provided to store the number of queuing packets and to make the priority jump from 40 to a value of 50 or more if this number exceeds a predetermined value.

The priority to be assigned to the sound channels must take account of the fact that they may belong to several categories, obeying different distribution laws. A first law, or "law of 90 bytes per block", corresponds to transmission of sound in compressed form with first level protection or to linear encoding transmission with second level production.

The second law, with 120 bytes per block and distribution at the rate of three blocks for four packets, corresponds to linear encoding with first level production or to a compression encoding with second level protection. The group of four packets making up three blocks for the laws of 120 bytes per block must not be interleaved with the packets from another channel of the same type.

One solution which simultaneously takes account of this requirement and avoids excessively favouring one channel over another consists in adopting the following priority rule.

For each sound channel with the 90 bytes law, the minimum priority is 80, and it is raised by one for each stored packet: the priority thus rises to 84 for five stored packets. In general, a maximum value is set, for example 89.

A lower base priority, for example 70, is assigned to each sound channel with the 120 bytes law and three blocks for four packets. It can be raised by one for each queuing packet, with a maximum of 79, as long as transmission of a group of three blocks has not begun. As soon as such a transmission begins, the priority of the following packets of the same group is increased by a number of unit such that the new priority is higher than that of all the other channels having a law of 120 bytes per block. The increase may, for example, be made by incrementation of the priority by a number equal to the difference between 10 and 1 for each packet already transmitted.

Thus, for example, the priority is raised to:
83 for four reserve packets;
82 for three reserve packets;
81 for two reserve packets.

Once the four packets have been transmitted, the corresponding sound source resumes its normal priority rank, which corresponds to 70 if only one packet is queuing.

The lowest priority is assigned to the stuffing packets.

This insertion strategy is extremely flexible and makes it possible to introduce sources easily by assigning intermediate priorities to them.

I claim:

1. Multiplexing device for insertion of digital packets, supplied by a plurality of different sources, in a common transmission channel having an average data rate at least equal to the sum of the average data rates supplied by the sources, comprising a packet call input unit connected to the transmission channel, wherein: at least some of said sources are cascaded the downstream one of said cascaded sources constituting an interface with the input unit; each source in the cascade comprises means for generating, for each packet, an insertion priority order which is a function of the type of packet, of the number of stored packets, and of insertion rules associated with the type of packets to be transmitted; and each cascaded source, with the exception of the most upstream source, has a routing circuit supplying at its output the highest priority among the two priorities applied to its input, and of which one corresponds to the respective source itself and the second to the upstream source located upstream.

2. Device as claimed in claim 1, wherein each source is designed to set the order priority f the packet to be transmitted once for all.

3. Device as claimed in claim 1, wherein at least some of the sources are designed to give the packets a priority which increases responsive to the waiting time.

4. Device as claimed in claim 1, wherein each source, other than the upstream source, comprises a routing circuit having a priority comparator controlling a transmission authorization switch and a packet transmission switch, the switches of the sources being mounted in cascade in order to cause the sending of a packet by that source in which the packet stored before being sent first has the highest priority.

5. Device as claimed in claim 1 for insertion of packets to make up a digital multiplex message of a television signal of the X MAC/PACKET conditional access type, wherein sound channel sources supplying three digital blocks for four packets are designed to increase the priority thereof as soon as the transmission of a group of three blocks begins.

6. Device as claimed in claim 5, wherein each of the sound channel sources is designed so that the priority thereof rises by one for each stored packet, the increase in priority at the start of the transmission of a group of three blocks being sufficient so that the source that has begun to transmit has a priority higher than that of all the other sound sources attempting to transmit by groups of three blocks in four packets.

7. Device as claimed in claim 6, for conditional access television signal according to EUROCRYPT standard, characterized in that entitlement management message sources (EMM), entitlement checking message sources (ECM) and a zero channel source are assigned fixed priorities, with degrees increasing in that order and lower than those of the sound channels.

8. Multiplexing device for insertion of digital packets, supplied by a plurality of different sources, in a common transmission channel having an average data rate at least equal to the sum of the average data rates supplied by the sources, comprising a packet call input unit connected to the transmission channel, wherein: all said sources are cascaded, the downstream one of said cascaded sources constituting an interface with the input unit; each source in the cascade comprises means for generating, for each packet, an insertion priority order which is a function of the type of packet, of the number of stored packets, and of insertion rules associated with the type of packets to be transmitted; and each cascaded source, with the exception of the most upstream source, has a routing circuit supplying at its output the highest priority among the two priorities applied to its input, and of which one corresponds to the respective source itself and the second to the upstream source located upstream.

* * * * *